United States Patent [19]

Carriere

[11] 4,344,336
[45] Aug. 17, 1982

[54] DIFFERENTIAL TRACTION DRIVE WITH EXTREME OVERALL TORQUE RATIOS FOR USE IN A GAS TURBINE ENGINE DRIVELINE

[75] Inventor: Donald L. Carriere, Livonia, Mich.

[73] Assignee: Ford Motor Company, Dearborn, Mich.

[21] Appl. No.: 59,848

[22] Filed: Jul. 23, 1979

[51] Int. Cl.³ .................... F16H 37/06; F16H 37/00
[52] U.S. Cl. ................................ 74/690; 74/681; 74/682; 74/720.5; 74/740
[58] Field of Search ................. 74/681, 682, 690, 691, 74/695, 720.5, 674, 677, 687, 688, 740

[56] References Cited

U.S. PATENT DOCUMENTS

| | | | |
|---|---|---|---|
| 2,181,380 | 11/1939 | Pollard | 74/691 |
| 2,216,190 | 10/1940 | Erban | 74/690 |
| 2,446,462 | 8/1948 | Dodge | 74/691 X |
| 3,688,600 | 9/1972 | Leonard | 74/690 |
| 3,765,270 | 10/1973 | Limeux | 74/690 |

FOREIGN PATENT DOCUMENTS 2316518 10/1974 Fed. Rep. of Germany ........ 74/690

Primary Examiner—Leslie Braun
Attorney, Agent, or Firm—Frank G. McKenzie; Donald J. Harrington

[57] ABSTRACT

A power transmission mechanism for a gas turbine engine driveline comprising a geared differential and planetary gear system adapted to receive the output power of a single shaft turbine rotor and to effect a high speed reduction and a split torque delivery path whereby a portion of the driving torque is distributed to a multiple ratio transmission mechanism through a direct mechanical path and the balance of the torque is distributed through a traction drive unit with infinitely variable ratio characteristics.

6 Claims, 11 Drawing Figures

First Ratio - No Engine Braking

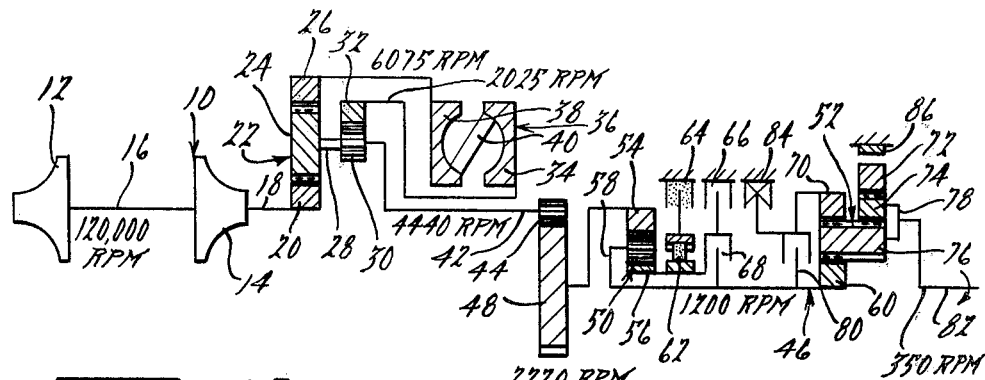
FIG. 1A. *First Ratio – No Engine Braking*
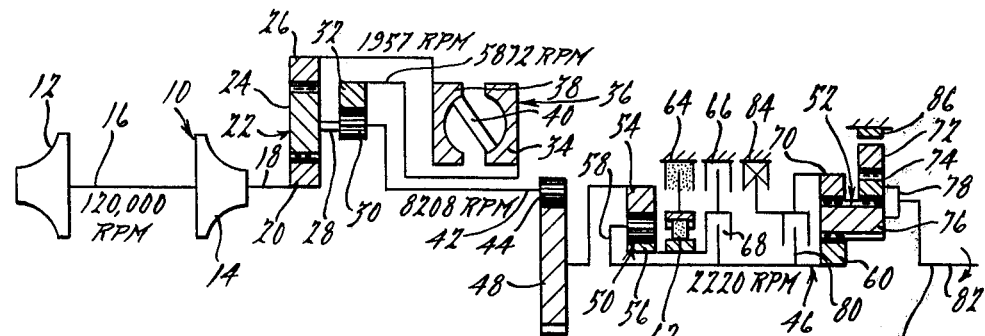
FIG. 1B. *First Ratio – No Engine Braking*
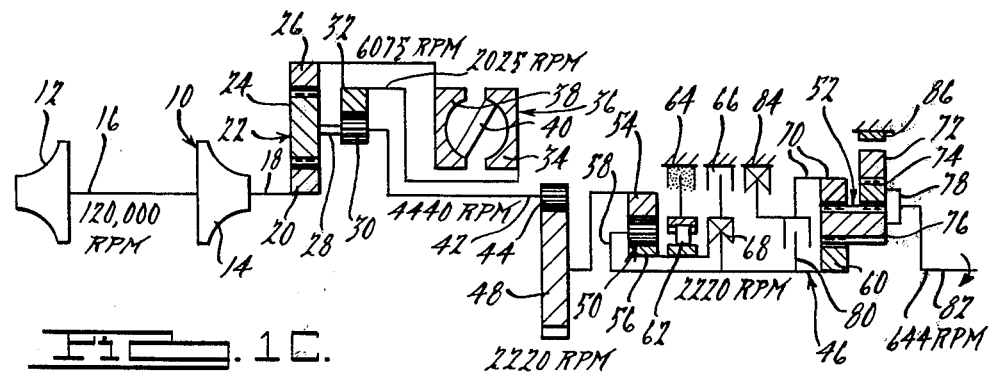
FIG. 1C. *Second Ratio – Engine Braking*

Third Ratio - Engine Braking

FIG. 1G. Fourth Ratio – Engine Braking

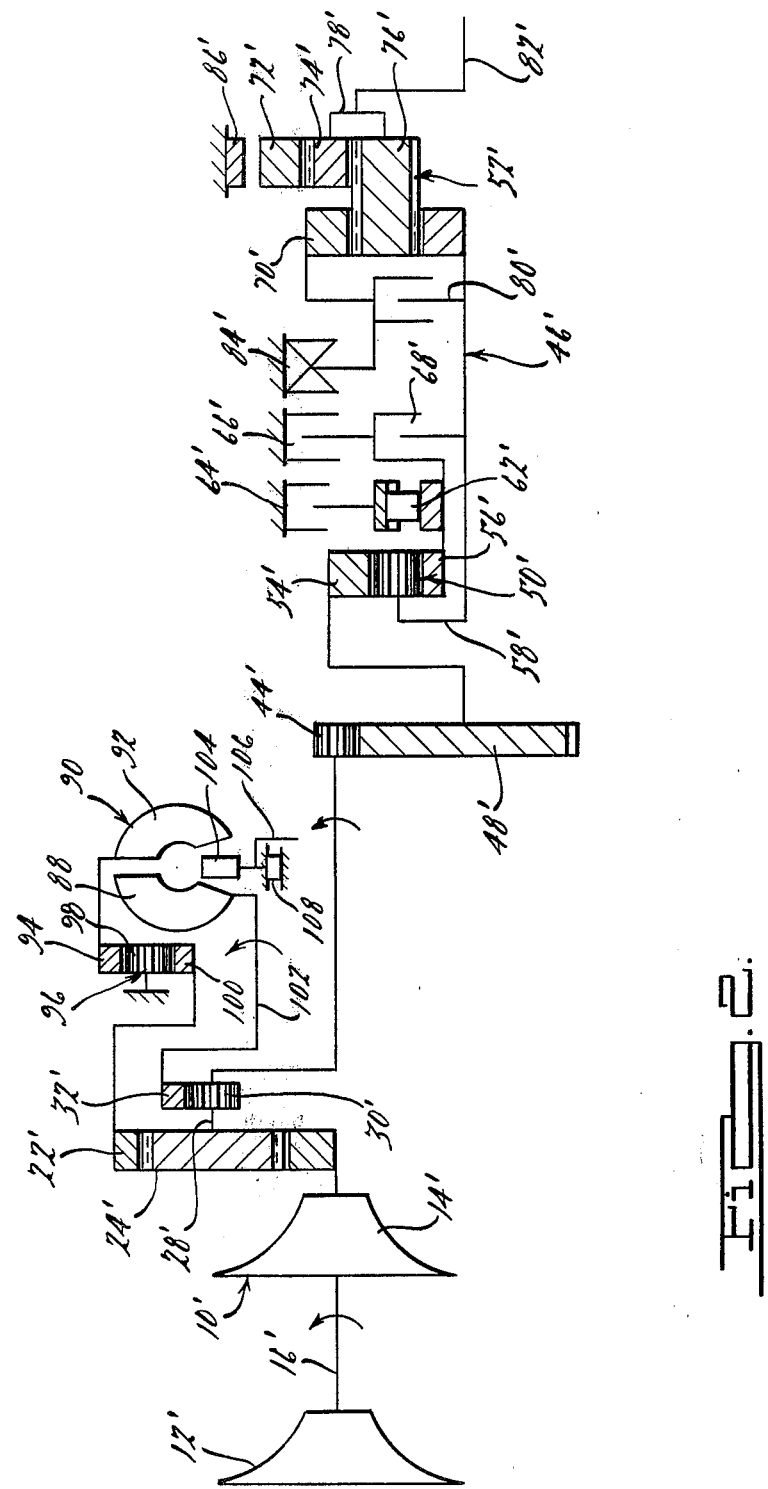

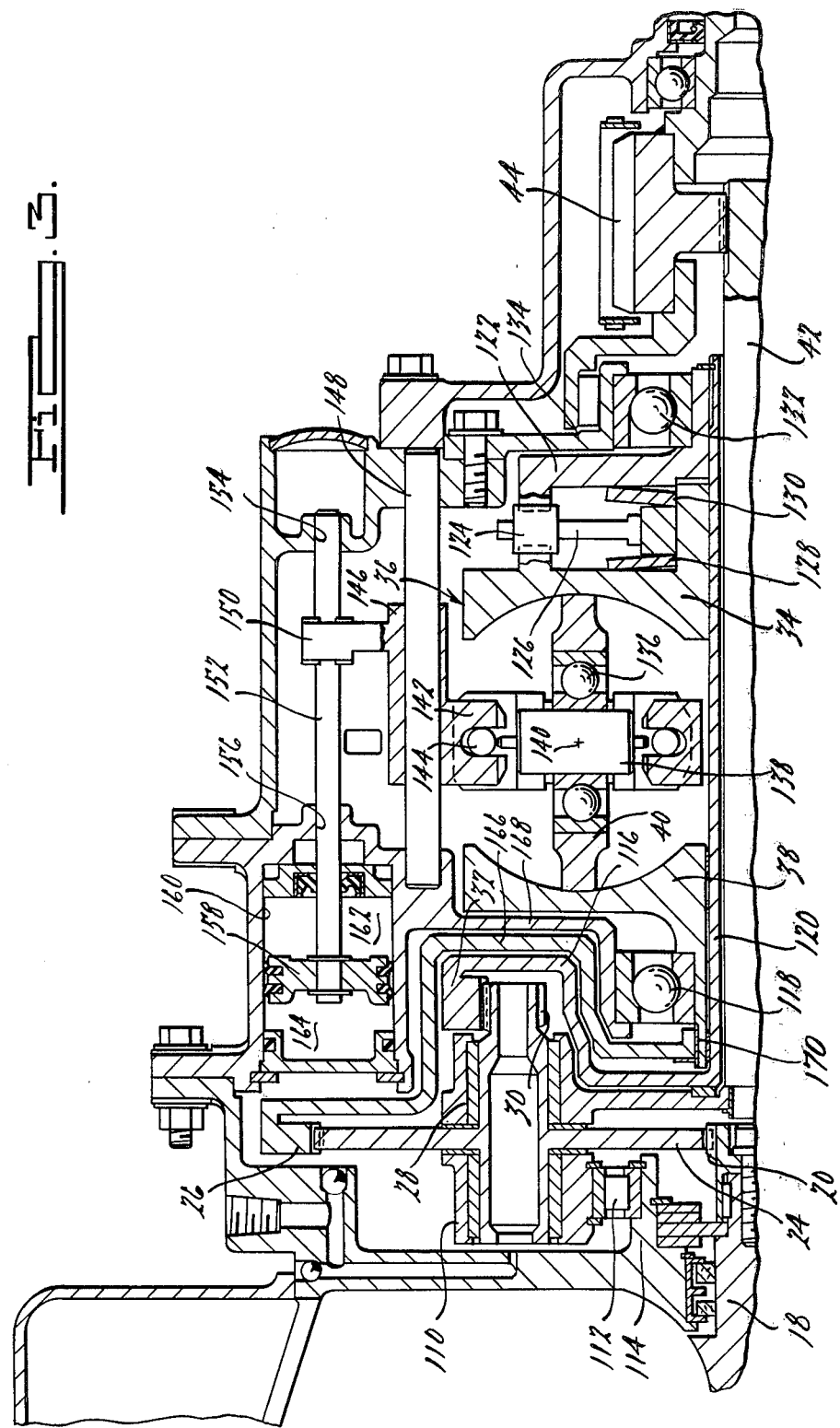

DIFFERENTIAL TRACTION DRIVE WITH EXTREME OVERALL TORQUE RATIOS FOR USE IN A GAS TURBINE ENGINE DRIVELINE

GENERAL DESCRIPTION OF THE INVENTION

My invention comprises improvements in a gas turbine engine driveline for a single shaft gas turbine engine. Such engines require a continuously variable torque ratio characteristic in the driveline if it is to be used successfully for automotive purposes. According to one embodiment of my invention the infinitely variable characteristic is achieved by a toroidal friction drive having a speed ratio variation of approximately 0.33:1 to 3:1. Another embodiment of my invention uses a hydrokinetic torque converter with an adjustable stator. The output torque of the infinitely variable portion of the driveline is connected to the input of a multiple ratio gear system.

For each ratio in the multiple ratio gear system the infinitely variable portion of the driveline provides an overall torque variation between relatively extreme speed ratio limits. The torque developed by the single shaft turbine enters a geared differential planetary gear unit which is used in combination with the infinitely variable torque ratio portion of the driveline. The differential gear unit acts as a reduction gear mechanism, and it also splits power between a mechanical torque delivery path and the infinitely variable torque ratio portion of the driveline. The mechanical path extends directly to the input element of a multiple ratio gear system. The power delivered to the infinitely variable traction drive or to the adjustable stator torque converter, as the case may be, varies between approximately 17 percent and 33 percent of the engine power depending upon the speed ratio for which the infinitely variable portion is designed. This reduces the size of the infinitely variable unit and results in a relatively low power loss. The ratio coverage for the infinitely variable unit may be approximately 9:1. Because of the split power path, the effective ratio coverage is 1.85:1. That effective ratio of 1.85:1 is combined with a multiple ratio gear system.

During acceleration from a standing start, the infinitely variable portion assumes an extreme underdrive condition. It then approaches a minimum underdrive condition for each of the ratios of the multiple ratio gear mechanism. In the case of the traction drive, this is achieved by tilting traction rollers for the toroidal discs by means of a servo mechanism. When a minimum underdrive condition is reached, the transmission shifts and the infinitely variable portion again assumes its original maximum underdrive condition.

A toroidal drive capable of being used in an environment of the type disclosed in the specification is shown in Pollard U.S. Pat. No. 2,181,380 as well as in Dodge U.S. Pat. No. 2,446,462. A typical gear arrangement in combination with a hydrokinetic fluid coupling or torque converter is shown in Johnson U.S. Pat. No. 3,585,345. In each of these prior art patents the infinitely variable characteristic is achieved without any reference to the concept of providing a split torque delivery path between a high speed driving member and an output member to achieve the torque ratio extremes that are required to provide usable driving torque from a high speed single shaft turbine rotor to the traction wheels for an automotive vehicle.

BRIEF DESCRIPTION OF THE FIGURES OF THE DRAWINGS

FIGS. 1A through FIG. 1I shows a differential traction drive with a four-speed multiple ratio gear system in combination with a high speed turbine motor. Each of the Figures represents a separate driving condition.

FIG. 2 is a schematic representation of a hydrokinetic torque converter rather than the differential traction drive of FIGS. 1A through 1I to obtain an infinitely variable torque characteristic.

FIG. 3 is a cross-sectional view of the differential traction drive shown schematically in FIGS. 1A through 1I.

PARTICULAR DESCRIPTION OF THE INVENTION

Figure 1D:
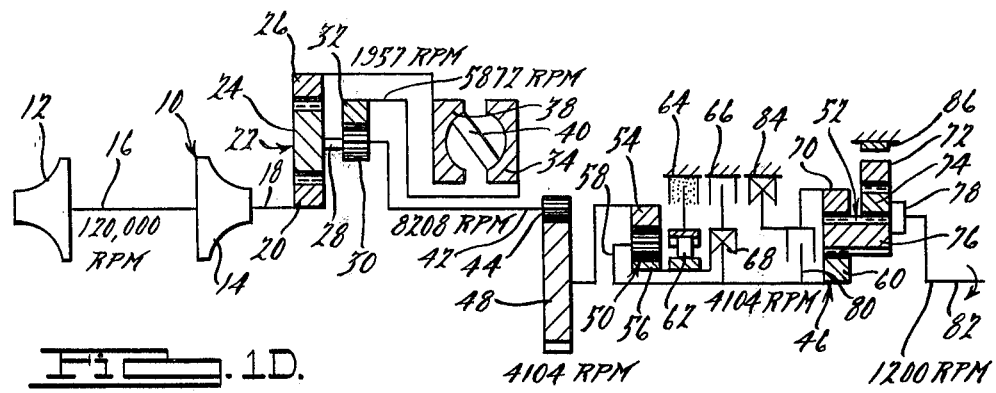
Figure 1E:
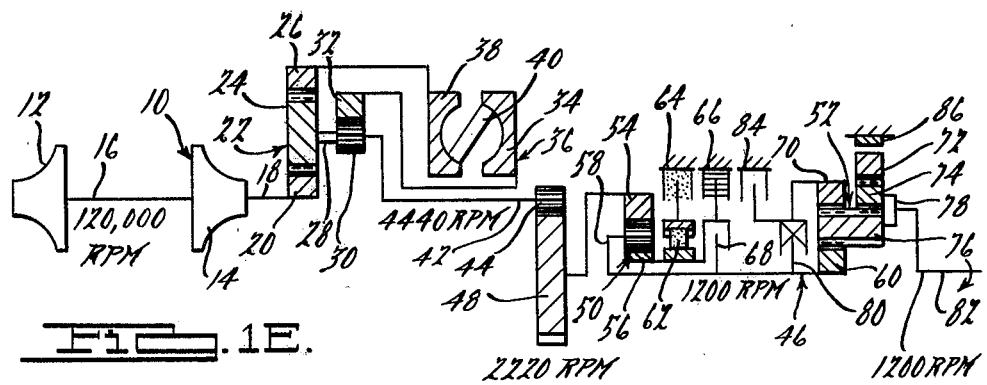

In FIG. 1A reference numeral 10 designates generally a single shaft of a gas turbine engine that comprises a compressor motor 12 and a turbine rotor 14. The compressor 12 and the turbine 14 are joined by a torque transfer shaft 16. An output shaft 18 is connected to the turbine 14 and is adapted to distribute torque to the sun gear 20 of a simple planetary gear unit 22. The compressor 12 is adapted to compress intake air in known fashion and to distribute the intake air to a combustor. The combustion products for the combustor are transferred through nozzles to turbine rotor 14. The torque developed by turbine 14 is used to drive the compressor 12 and also to deliver useful power to the shaft 18. The speed of rotation of the single shaft turbine 10 is very high. For example, in an automotive vehicle application the turbine may operate at speeds of about 120,000 rpm as it develops about 138 horsepower.

The gear unit 22 includes, in addition to the sun gear 20, a set of planet pinions 24 and a ring gear 26. The pinions 24 are journalled on carrier 28. Connected to carrier 28 are pinions 30 of smaller pitch diameter than the diameter of the pinions 24. Engaged with pinion 30 is a second ring gear 32 which is connected to a toroidal disc 34 of a toroidal friction disc differential drive mechanism 36. A second toroidal disc 38 of the drive 36 is connected drivably to ring gear 26. A toroidal friction drive disc 40 is situated between the discs 34 and 38. The discs 40 are rollers that are journalled for rotation about their geometric axes. The geometric axes can be tilted by a suitable control mechanism that will be described with reference to FIG. 3 so that the driving ratio between the discs 34 and 38, one with respect to the other, can be changed.

The direction of rotation of one disc is opposite to the direction of rotation of the other. As the angle of the rollers 40 is changed, the driving ratio of one disc with respect to the other also is changed.

The disc 38 serves as a torque input member for the infinitely variable portion of the mechanism since it is connected directly to the ring gear 26. Disc 34 acts as a torque output member, and the torque distributed to it is transferred directly to the ring gear 32. A portion of that torque is distributed then to the carrier 28 and to the gear unit 22 while the balance is distributed to the shaft 42, which in turn is connected to the torque input pinion 44 of the multiple ratio gear mechanism shown generally at 46. The pinion 44 engages drivably torque input gear 48 for the transmission mechanism 46.

Transmission mechanism 46 comprises a simple planetary gear unit 50 and a compound planetary gear unit 52. Gear unit 50 includes ring gear 54, sun gear 56, and carrier 58 which is connected to sun gear 60 of the compound planetary gear unit 52. Ring gear 54 is connected directly to torque input gear 48. Reaction torque on the sun gear 56 is distributed through an overrunning coupling 62 to a friction disc brake 64 which can be applied to effect a start-up driving condition for the vehicle. By preference the brake 64 is in the form of a slip clutch which can act as a neutral clutch for the driveline. Sun gear 56 is connected to the inner race of the overrunning coupling 62. Slip clutch 64 anchors the sun gear 56 against rotation in one direction but permits freewheeling motion of the sun gear 56 in the opposite direction.

The overrunning coupling 62 can be bypassed, and the sun gear 56 can be anchored also by a friction brake 66 which can be selectively applied by a suitable control mechanism. Sun gear 56 and carrier 58 are adapted to be connected together by friction clutch 68 to effect a lock-up 1:1 driving condition for the gear unit 50.

Compound planetary gear unit 52 comprises, in addition to the sun gear 60, a first ring gear 70, a second ring gear 72, a set of short planet pinions 74, a set of long planet pinions 76 and a common carrier 78 for the pinions 74 and 76. Pinions 74 are adapted to engage drivably the pinion 76 and also ring gear 72. Long planet pinions 76 are adapted to be drivably engaged by sun gear 60 and ring gear 70. A friction clutch 80 is adapted to be selectively applied to effect a lock-up, one-to-one driving ratio for the compound planetary gear unit 52 as it connects the sun gear 60 to the ring gear 70.

Power output shaft 82 is connected to the common carrier 78. Torque is distributed from the shaft 82 to a driving differential-and-axle assembly for the vehicle.

Friction brake 84 is adapted to anchor selectively the ring gear 70 to effect hill braking or engine braking during operation in the second speed ratio.

FIG. 1A represents the condition of the torque delivery elements of the mechanism during first speed ratio operation. Hill braking is not obtainable because of the presence of the overrunning coupling 62.

If it is assumed that the shaft 16 is rotating at a speed of 120,000 rpm, the overall speed reduction is sufficiently high so that the output speed of the shaft 82 is about 350 rpm. To effect the FIG. 1A condition, the brake 84 is applied and the start-up slip clutch 64 is applied. The rollers 40 for the infinitely variable portion of the mechanism are positioned as shown to effect a maximum speed reduction for the portion of the power that is distributed through it in parallel with the power delivered through the mechanical torque delivery path shown at 22. The ring gear 70 acts as the reaction point for the mechanism during operation in this mode. The reaction point for the simple planetary gear unit 50 is the overrunning coupling 62 and the slip clutch 64.

FIG. 1B shows the same mode of operation as that shown in FIG. 1A, the infinitely variable traction drive unit is shifted from the extreme underdrive condition to the minimum underdrive position as the multiple ratio gear mechanism 46 retains its original condition.

To effect a ratio change to the second drive range, the traction drive unit is returned to its original extreme underdrive condition and the brake 66 is engaged. This permits engine braking to occur during operation in the second speed ratio, and it also locks up the first simple planetary gear unit 50 so that no speed reduction occurs at that point. All of the speed ratio in the multiple ratio gear system 46 is achieved by the compound planetary gear unit 52. The slip clutch 64 and the brake 84 remain applied. FIG. 1D shows the same condition for the gear unit 46 as that shown in FIG. 1C, but the differential drive unit has been moved from the extreme underdrive condition to the minimum underdrive condition.

A third drive range is achieved by disengaging the brake 84 and applying the clutch 80. This locks up the compound planetary gear unit 52 so that no speed reduction occurs at that point. The clutch 68 is released, however, so sun gear 56 of the simple planetary gear unit 50 is capable of acting as a reaction point. The overrunning coupling 62 and the slip clutch 64 distribute reaction torque from sun gear 56 to the transmission case. Brake 66 can be applied during operation in this mode if hill braking is desired. This brake is in parallel relationship with respect to the overrunning coupling 62.

Figure 1F:
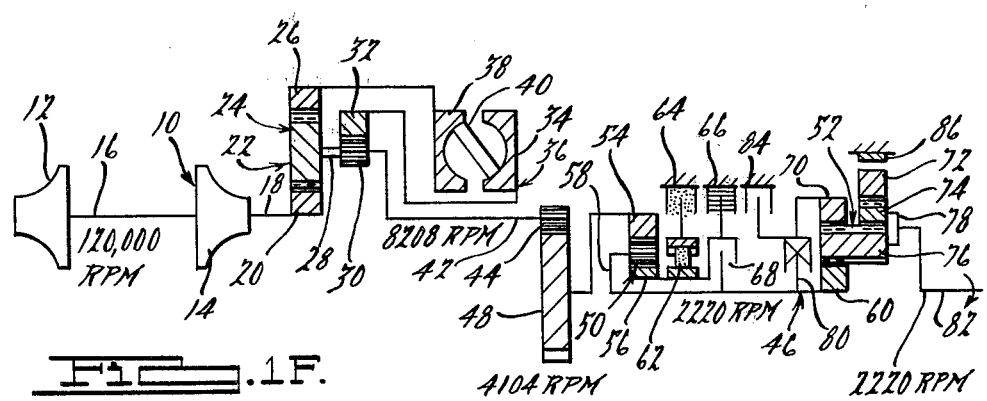

FIG. 1F represents also the third drive range condition although the traction drive unit has been moved from the extreme underdrive condition to the minimum underdrive condition.

Figure 1H:
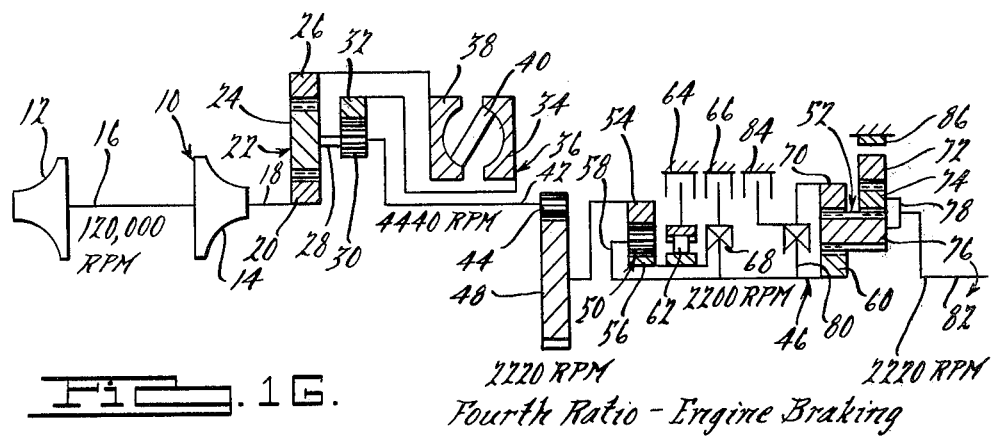
Figure 1H:
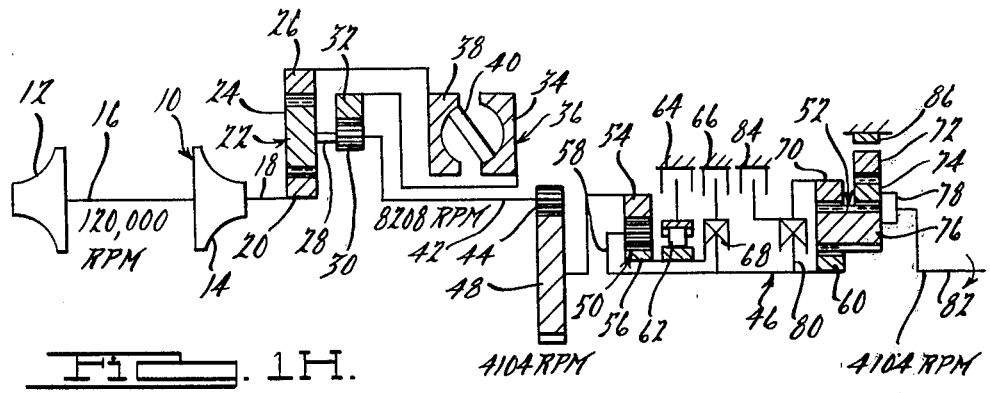

In FIG. 1G I have shown the fourth drive range condition wherein clutches 68 and 80 are applied simultaneously while the brakes 66 and 84 are released. Although the slip clutch 64 may remain applied, it is ineffective since the overrunning coupling 62 freewheels. The traction drive is the only portion of the mechanism that effects speed ratio reduction. FIG. 1G represents the position of the rollers 40 that effects the extreme underdrive condition of the toroidal drive portion of the mechanism, and FIG. 1H represents the minimum underdrive condition for the traction drive as the multiple ratio gear system 46 remains in a 1:1 driving condition.

Figure 1I:
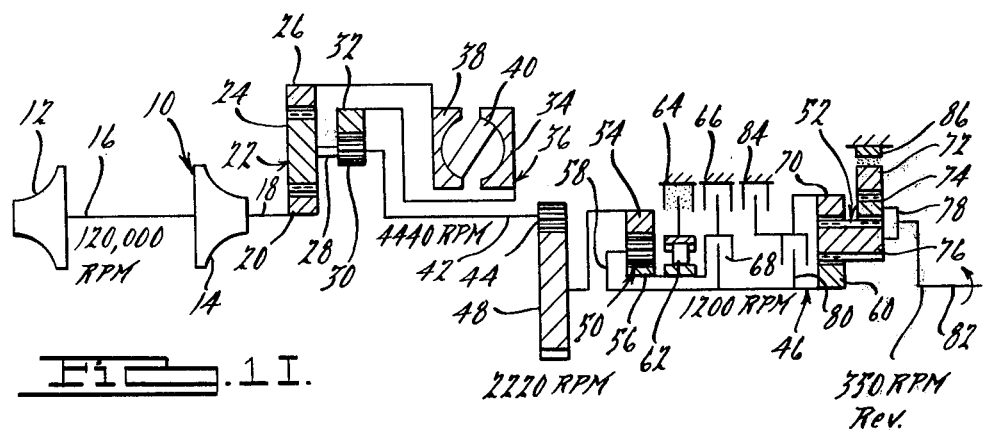

FIG. 1I shows the reverse drive mode. In this case ring gear 72 is anchored by brake 86 so that ring gear 72 serves as a reaction point for the reverse torque delivery path. The slip clutch 64 and the overrunning coupling 62 are effective to anchor sun gear 56 so that the speed ratio reduction of the gear unit 50 is compounded with the speed ratio reduction of the compound planetary gear unit 52. A torque ratio variation in addition to that achieved by the gearing is provided by the traction drive unit by adjusting the angularity of the rollers 40 in the manner previously described.

In FIG. 2 I have shown a hydrokinetic torque converter that serves as a differential, infinitely variable unit in place of the traction drive of FIG. 1A through 1I. It can be combined with a multiple ratio gear system of the type shown at 46 in FIGS. 1A through 1I. The mechanism of FIG. 2 includes a simple planetary gear unit 22' which corresponds to the gear unit 22 of FIGS. 1A through 1I. It includes also a second ring gear 32' corresponding to the ring gear 32 of the earlier embodiment, and pinion 30' which corresponds to the pinion 30 of the earlier embodiment.

The ring gear 32' is connected to turbine 88 of a hydrokinetic torque converter 90. Converter 90 includes impeller 92 which is arranged in fluid flow relationship with respect to the turbine 88. Impeller 92 is connected to ring gear 94 of a reversing gear unit 96. Gear unit 96 includes pinions 98 and a sun gear 100, the latter being connected to ring gear 22'. The purpose of the gear unit 96 is to reverse the effective direction of torque distributed from the ring gear 22' to the impeller so that the direction of the turbine torque delivered from the turbine 88 to the ring gear 32' will be in the right direction. Turbine 88 is connected directly to the ring gear 32' by turbine shaft 102.

As in the previous embodiment, the carrier 28' which corresponds to the carrier 28 of the earlier described embodiment, is connected to drive pinion 44' which engages a torque input element of a multiple ratio gear system as shown at 48'.

The torque converter 90 includes a bladed stator 104 located between the flow outlet section of the turbine 88 and the flow inlet section of the impeller 92. The angularity of the stator blades can be changed by a suitable offset pin mounting arrangement 106 so that the effective torque ratio of the hydrokinetic torque converter 90 can be changed. An overrunning brake 108 serves as a reaction point for the stator blades 104. The torque converter can be adjusted or made effective to provide a maximum underdrive condition or a minimum underdrive condition for each of the multiple ratios that are produced by the multiple ratio gear system with which the mechanism in FIG. 2 is used.

In FIG. 3 I have shown a working embodiment of the structure shown schematically in FIGS. 1A through 1I.

As seen in FIG. 3, the pinion 24 and the pinion 30 are supported on a carrier 28 which is journalled on a carrier support 110 which in turn is journalled by bearing 112 on a transmission housing support wall 114. A connection between ring gear 32 and the traction drive disc 34 is achieved by drive plate 116, which surrounds the gear 32 and bearing 118 for disc 38. It includes also a sleeve shaft 120, which surrounds shaft 42 and which is splined to drive cam 122. Cam surfaces are formed on the periphery of cam 122 and these engage cam rollers 124 carried by spider member 126. Preloaded Belleville washers 128 and 130 are situated on either side of the roller supporting spider member 126.

Cam member 122 is journalled by bearing 132 which distributes reaction torque to the bearing support wall 134 connected to the transmission housing. The Belleville washers 128 and 130 apply a preload to the disc 34 thereby maintaining frictional contact of the discs 38 and 34 with the rollers 40.

The rollers 40 are journalled by bearings 136 on a support shaft 138. The shaft is mounted for oscillation about axis 140. A yoke 142 surrounds pins 144 carried by the mounting structure for the shaft 138. Yoke 142 forms a part of shift fork 146 that is positioned on shift rail 148. Fork 146 has a slot that is engaged by shift finger 150 carried by piston rod 152, which is slidably supported at 154 and 156 in the housing for the transmission. Piston 158 carried by the rod 152 is positioned in control cylinder 160 and defines therewith a pair of working chambers 162 and 164. Fluid pressure can be admitted selectively to either of the working chambers 162 or 164 to effect shifting movement of the piston rod 152 and a corresponding oscillation of the rollers 40 about the axis 140 as the yoke 142 is shifted in a longitudinal direction. The extreme positions for the rollers 40 shown in FIG. 3 represent the 1:1 drive condition for the discs 38 and 34.

A drive plate for the disc 38 is shown at 166. It is located on bearing support wall 168 and the drive plate 116, and its hub is splined to the hub of the drive disc 38 as shown at 170.

When the multiple ratio gear system is conditioned for any given gear ratio, pressure chamber 162 is pressurized at a higher value than pressurized chamber 164. This causes the piston 158 to be stroked in a lefthand direction. At that time the friction rollers 40 will extend from approximately a 2:00 position to a 7:00 position as the piston 158 is stroked in a right-hand direction. Because of a pressure differential change for the pressure in chambers 164 and 162, the piston 158 will be stroked thereby causing the traction drive rollers 40 to move toward a position in which the rollers extend from a 10:00 position to a 4:00 position.

The cam and roller assembly effects a clamping force on the toroidal discs, the amount of the clamping force being proportional to the torque delivered through the rollers 40.

Having described preferred embodiments of my invention, what I claim and desire to secure by U.S. Letters Patent is:

1. A differential split torque driveline adapted to deliver torque from a high speed driving shaft to a driven member, comprising:

a planetary gear unit having a sun gear, a ring gear and a planet pinion, said planet pinion engaging drivably said sun gear and said ring gear, said sun gear being connected to said driving shaft, a carrier for said pinion, a secondary pinion connected drivably to said first pinion and supported rotatably on said carrier, a second ring gear engaging said second pinion, a differential torque delivery gear unit with infinitely variable torque ratio characteristics having an input member and an output member with means for establishing a driving relationship therebetween, said first mentioned ring gear being connected to one driving member of said differential unit and said second ring gear being connected to the other member of said differential unit whereby the speed relationship between said ring gears is determined by the speed ratio relationship of the differential unit members, and a driven member connected drivably to said carrier.

2. The combination as set forth in claim 1 wherein said differential infinitely variable drive unit comprises a hydrokinetic torque converter having a impeller and a turbine situated in toroidal fluid flow relationship, a stator in said converter, means for readjusting the angularity of the blades of said stator with respect to the flow exit sections of said turbine and the flow entrance section of said impeller, a turbine gear unit having a planet pinion, a sun gear and a ring gear, the ring gear of said turbine gear unit being connected to said impeller, the sun gear of said turbine gear unit being connected to said first ring gear, and the planet pinion of said turbine gear unit being journalled for rotation about a fixed axis whereby the direction of rotation of said impeller with respect to the direction of rotation of said first ring gear is reversed.

3. A split torque differential drive mechanism adapted to deliver driving torque from a high speed driving shaft to a driven member, a multiple ratio gear unit having an input element connected to said driven member, a driven shaft connected to a power output element of said multiple ratio gear unit, a first planetary gear unit comprising a sun gear, a first ring gear and a first planet pinion, a carrier rotatably supporting said first planet pinion in meshing engagement with said ring gear and said sun gear and a second planet pinion connected to said first planet pinion and rotatable on said carrier, a second ring gear engaging said second planet pinion, a differential infinitely variable drive unit having an input element and an output element with torque transmitting means drivably connecting said elements, one element of said differential drive unit being connected to said first ring gear and the other element being connected to said second ring gear, said carrier being connected to said driven member.

4. The combination as set forth in claim 2 wherein said differential infinitely variable drive unit comprises a hydrokinetic torque converter having an impeller and a turbine situated in toroidal fluid flow relationship, a stator in said converter, means for readjusting the angularity of the blades of said stator with respect to the flow exit sections of said turbine and the flow entrance section of said impeller, a turbine gear unit having a planet pinion, a sun gear and a ring gear, the ring gear of said turbine gear unit being connected to said impeller, the sun gear of said turbine gear unit being connected to said first ring gear, and the planet pinion of said turbine gear unit being journalled for rotation about a fixed axis whereby the direction of rotation of said impeller with respect to the direction of rotation of said first ring gear is reversed.

5. A differential traction drive for connecting a high speed shaft to a driven member, said traction drive comprising a first sun gear, a first ring gear connected to a first traction drive element, a first planet pinion driveably connected to said sun gear and said ring gear, a second planet pinion connected to said first planet pinion, a common carrier for said planet pinions, a second ring gear engaging said second planet pinion and a second traction drive element, said drive elements defining therewith a pair of juxtaposed semi-toroidal friction surfaces, a friction disc driveably engaging said surfaces and adapted for rotation about its geometric center, and means for adjusting the angularity of the axis of rotation of said friction disc whereby the speed ratio relationship of one traction drive element with respect to the other is changed, said carrier being connected to said driven member.

6. The combination as set forth in claim 5 wherein said traction drive includes a driven shaft and multiple ratio gearing connecting said driven member to said driven shaft whereby an infinitely variable torque ratio for each ratio of the multiple ratio gearing can be achieved by adjusting the angularity of said friction disc.

* * * * *